US009388745B2

United States Patent
Bothien et al.

(10) Patent No.: US 9,388,745 B2
(45) Date of Patent: Jul. 12, 2016

(54) METHOD FOR SWITCHING OVER A COMBUSTION DEVICE BETWEEN A FIRST FUEL AND A SECOND FUEL

(75) Inventors: Mirko Ruben Bothien, Zürich (CH); Martin Zajadatz, Küssaberg/Dangstetten (DE); Douglas Anthony Pennell, Windisch (CH)

(73) Assignee: GENERAL ELECTRIC TECHNOLOGY GMBH, Baden (CH)

( * ) Notice: Subject to any disclaimer, the term of this patent is extended or adjusted under 35 U.S.C. 154(b) by 915 days.

(21) Appl. No.: 13/601,575

(22) Filed: Aug. 31, 2012

(65) Prior Publication Data

US 2013/0086918 A1   Apr. 11, 2013

(30) Foreign Application Priority Data

Sep. 2, 2011   (IT) .............................. MI2011A1576

(51) Int. Cl.
*F02C 9/40* (2006.01)
*F02C 9/26* (2006.01)
*F02C 9/34* (2006.01)
*F23R 3/36* (2006.01)

(52) U.S. Cl.
CPC ... *F02C 9/26* (2013.01); *F02C 9/34* (2013.01); *F02C 9/40* (2013.01); *F23R 3/36* (2013.01); *F23N 2041/20* (2013.01)

(58) Field of Classification Search
CPC ............... F02C 9/26; F02C 9/34; F02C 9/40; F23R 3/36; F23D 17/002; F23D 2204/10; F23N 2037/08
See application file for complete search history.

(56) References Cited

U.S. PATENT DOCUMENTS

| 5,826,423 | A  | * | 10/1998 | Lockyer | F23C 7/008 239/419.3 |
| 5,865,024 | A  | * | 2/1999 | Kress | F23D 14/62 60/39.463 |
| 6,041,743 | A  | * | 3/2000 | Takubo et al. | 122/367.3 |
| 6,434,945 | B1 | * | 8/2002 | Mandai et al. | 60/740 |
| 2001/0027637 | A1 | * | 10/2001 | Norster et al. | 60/39.03 |

(Continued)

FOREIGN PATENT DOCUMENTS

| CH | WO 2011026982 A1 | * | 3/2011 | ................ F02C 3/22 |
| EP | 1 942 260 A1 | | 7/2008 | |

(Continued)

OTHER PUBLICATIONS

Search Report issued on Apr. 12, 2012, by the Italian Ministry of Economic Development as the searching authority for IT MI2011A001576, and translation obtained from Windows Internet Explorer Translator.

(Continued)

*Primary Examiner* — William H Rodriguez
(74) *Attorney, Agent, or Firm* — Buchanan Ingersoll & Rooney PC

(57) ABSTRACT

An exemplary method for switching over a combustion device from operation with a first premix fuel to a second premix fuel includes reducing and stopping a first premix fuel supply and then starting a second premix fuel supply. In an intermediate phase, after the first premix fuel supply stop and before the second premix fuel supply start, the combustion device is operated with one or more pilot fuels generating diffusion flames.

20 Claims, 1 Drawing Sheet

(56) References Cited

U.S. PATENT DOCUMENTS

| | | |
|---|---|---|
| 2005/0034457 A1 | 2/2005 | Gadde et al. |
| 2008/0087001 A1 | 4/2008 | Lilley et al. |
| 2008/0154474 A1* | 6/2008 | Iasillo ............... F02C 7/22 701/100 |
| 2009/0173057 A1* | 7/2009 | Yoshida ............ F01D 15/10 60/39.281 |
| 2010/0175382 A1* | 7/2010 | Eroglu ............... F23C 6/047 60/748 |
| 2010/0273117 A1* | 10/2010 | Eroglu ............................ 431/9 |
| 2011/0094239 A1* | 4/2011 | Koizumi et al. ............. 60/776 |
| 2011/0100018 A1* | 5/2011 | Nakamura ................... 60/776 |
| 2011/0126546 A1 | 6/2011 | Meeuwissen et al. |
| 2012/0247116 A1* | 10/2012 | Meeuwissen et al. ...... 60/772 |
| 2013/0291547 A1* | 11/2013 | Ochiai ......................... 60/772 |
| 2015/0059353 A1* | 3/2015 | Asai et al. ................... 60/778 |

FOREIGN PATENT DOCUMENTS

| | | |
|---|---|---|
| EP | 2 292 907 A1 | 3/2011 |
| EP | 2 299 091 A1 | 3/2011 |
| JP | 7-166891 | 6/1995 |
| JP | 2000-328965 A | 11/2000 |
| WO | WO 01/83965 A1 | 11/2001 |
| WO | WO 2009/068425 A1 | 6/2009 |

OTHER PUBLICATIONS

Written Opinion issued on Sep. 2, 2011, by the Italian Ministry of Economic Development as the searching authority for IT MI2011A001576.

\* cited by examiner

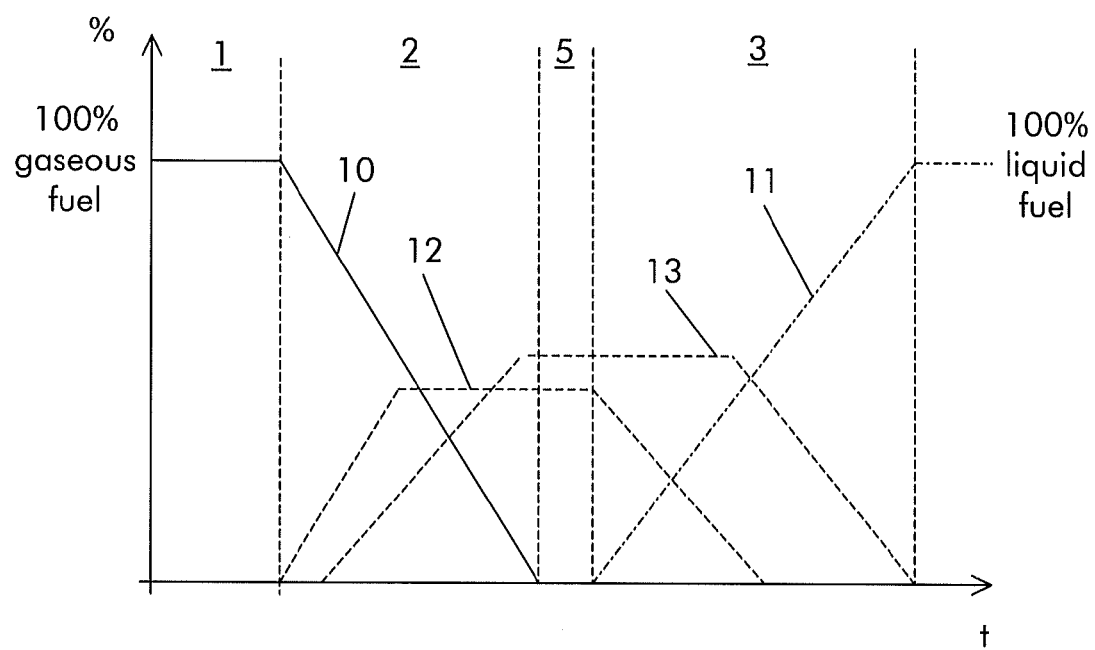

METHOD FOR SWITCHING OVER A COMBUSTION DEVICE BETWEEN A FIRST FUEL AND A SECOND FUEL

RELATED APPLICATION

This application claims priority under 35 U.S.C. §119 to Italian application MI2011A001576 filed in Italy on Sep. 2, 2011. The content of which is hereby incorporated by reference in its entirety.

FIELD

The present disclosure relates to control of a gas turbine, such as a method for controlling operation of a gas turbine and to a gas turbine model with a controller configured to carry out such a method.

BACKGROUND INFORMATION

Known combustion devices such as combustion devices that are part of a gas turbine are fed with a fuel and an oxidizer to generate flue gases that are expanded in a turbine.

In order to keep emissions (for example NOx, CO emissions) at low levels, premix combustion devices can be used.

In these kinds of combustion devices a fuel is first mixed with the oxidizer and the mixture is then burnt.

The fuel can be a liquid fuel (for example, oil) or a gaseous fuel (for example, natural gas or methane).

Gas turbines can be provided with supply lines for both liquid and gaseous fuel such that, if during operation one of the fuels is not available, operation can continue with the other fuel.

For these reasons it is often necessary to switch over from one fuel to the other. The switch over should be carried out online (e.g., during operation without stopping the gas turbine), because it is not possible to disconnect the generator driven by the gas turbine from the grid.

In order to switch over from one fuel to another fuel (both burnt in premix conditions) the amount of the first fuel is gradually reduced from its operational amount to zero, while, at the same time, the amount of the second fuel is gradually increased from zero to its operational amount. The total fuel supplied into the combustion device (e.g., being the sum of the first and second fuels) should be controlled such that it does not exceed a given amount that could cause damage.

Even if largely used, in some cases this switch over could generate pressure and thermal pulsations, which can be damaging and detrimental for the life of the combustion device. These conditions can also be detrimental for devices, such as, a turbine downstream of the combustion device and should therefore be counteracted for optimal performance.

SUMMARY

An exemplary method for switching over a combustion device from operation with a first premix fuel to a second premix fuel is disclosed, the method comprising: reducing and stopping a first premix fuel supply; operating the combustion device with at least one pilot fuel that generate diffusion flames; and starting a second premix fuel supply following generation of the diffusion flames.

BRIEF DESCRIPTION OF THE DRAWINGS

Further characteristics and advantages of the disclosure will be more apparent from the description of exemplary embodiments of the method illustrated by way of non-limiting example in the accompanying drawings, in which:

FIG. 1 is a graph of a method in which fuel percentages % are plotted as a function of time t in accordance with an exemplary embodiment of the present disclosure.

DETAILED DESCRIPTION

An exemplary embodiment of the present disclosure provides a method for switching over a combustion device operating in premix conditions from one fuel type to another fuel type by which pressure and thermal pulsations are counteracted.

FIG. 1 is a graph of a method in which fuel percentages % are plotted as a function of time t in accordance with an exemplary embodiment of the present disclosure.

As shown in FIG. 1, in a first phase (phase 1) the combustion device of, for example, a gas turbine, or a burner of a gas turbine operates with a first premix fuel 10.

In the context of the present disclosure, the first premixed fuel is a first fuel type, such as a gas fuel which is mixed with combustion air before ignition for premixed combustion. The second premix fuel is a second fuel type, such as a liquid fuel, which is mixed with combustion air before ignition for premixed combustion. The second premix fuel having a fuel composition which is different from the fuel composition of the first premix fuel or first fuel type. The method for switching over a combustion device from operation with the first premix fuel 10 to a second premix fuel 11 comprises reducing and stopping the first premix fuel supply (phase 2) and then starting a second premix fuel supply (phase 3).

In an exemplary embodiment, in an intermediate phase 5 after the first premix fuel supply stop (phase 2) and before the second premix fuel supply start (phase 3), the combustion device is operated with one or more pilot fuels 12, 13 generating only diffusion flames.

For example the pilot fuels include first and a second pilot fuels 12, 13, e.g., a first fuel type, which is injected to form a pilot flame, and a second fuel type, which is injected to form a pilot flame. The first fuel type used as a pilot fuel can for example be the same fuel type as the first premixed fuel, and the second fuel type used as a pilot fuel can, for example, be the same fuel type as the fuel type, which is second premixed fuel. According to an exemplary embodiment described herein, both pilot fuels 12, 13, are fed and fully support the combustion device operation during the intermediate phase 5. For example, only the two pilot fuels are fed into the combustor during this phase. As a result, no premixed fuel is fed into the combustor during this phase.

In addition, both the first and the second pilot fuels 12, 13 are injected together with both the first premix fuel 10 and the second premix fuel 11.

As shown in FIG. 1, the first pilot fuel 12 supply starts before the second pilot fuel 13 supply starts and the first pilot fuel 12 supply ends (e.g., terminates) before the second pilot fuel 13 supply ends (e.g., terminates).

In an exemplary embodiment of the present disclosure the first premix fuel 10 is a gaseous fuel and the second premix fuel 11 is a liquid fuel (e.g., a switch over from gaseous to liquid fuel occurs). In another exemplary embodiment, the first premix fuel 10 is a liquid fuel and the second premix fuel 11 is a gaseous fuel (e.g., a switch over from liquid to gaseous fuel occurs). In yet another exemplary embodiment, the first and the second premix fuels 10, 11 are both liquid or gaseous fuels.

When the first premix fuel 10 is a gaseous fuel the first pilot fuel 12 is a gaseous fuel, and when the first premix fuel 10 is a liquid fuel also the first pilot fuel 12 is a liquid fuel.

Likewise, when the second premix fuel 11 is a gaseous fuel the second pilot fuel 13 is a gaseous fuel and when the second premix fuel 11 is a liquid fuel the second pilot fuel 13 is a liquid fuel.

The first premix fuel 10 and the first pilot fuel 12 can be the same fuel (e.g., oil in case of liquid fuel or natural gas in case of gaseous fuel) and the second premix fuel 11 and the second pilot fuel 13 can be the same fuel (e.g., oil in case of liquid fuel or natural gas in case of gaseous fuel).

During an operation, in which transient operation (e.g., phase 2) generates pulsations, they are not amplified but they are damped during the phase 5 when only a diffusion flame is provided within the combustion device, because the diffusion flame is very stable.

In addition, during the phase 3 only very small pulsations can be generated which do not adversely affect the combustion device, and no pulsations from the phase 2 can be amplified, because of the intermediate phase 5 that stabilises the combustion.

The duration of the phase 5 should be chosen according to the specified conditions and desired results. The phase 5 can be of a duration that is long enough to stabilise the combustion and damp the pulsations. Because the duration of phase 5 is limited, emissions such as NOx or CO emissions, which could increase during the phase 5 due to the diffusion flame, are not an issue.

It should be apparent that the features described herein in accordance with the exemplary embodiments can be applied independently or in combination with one another as desired. Moreover, type and amount of materials used and the dimensions thereof can be chosen according to desired specifications, and their compatibility and suitability for achieving the desired results.

Thus, it will be appreciated by those skilled in the art that the present disclosure can be embodied in other specific forms without departing from the spirit or essential characteristics thereof. The presently disclosed embodiments are therefore considered in all respects to be illustrative and not restricted. The scope of the disclosure is indicated by the appended claims rather than the foregoing description and all changes that come within the meaning and range and equivalence thereof are intended to be embraced therein.

REFERENCE NUMBERS

1, 2, 3, 5 phase
10 first premix fuel
11 second premix fuel
12, 13 pilot fuel

What is claimed is:

1. A method for switching over a combustion device from operation with a first premix fuel to a second premix fuel during continuous operation of the combustion device comprising:
   reducing and stopping a first premix fuel supply to the combustion device;
   operating the combustion device with at least one pilot fuel to only generate diffusion flames to stabilize combustion in the combustion device after the first premix fuel is no longer supplied to the combustion device and prior to starting a second premix fuel supply to the combustion device; and
   starting the second premix fuel supply to the combustion device following generation of the diffusion flames, the second premix fuel supply having a composition that differs from a composition of the first premix fuel supply.

2. The method according to claim 1, wherein the at least one pilot fuel includes first and second pilot fuels, which are fed to the combustion device during operation of the combustion device.

3. The method according to claim 2, wherein the operating of the combustion device with the at least one pilot fuel to only generate diffusion flames occurs in an intermediate phase, after the first premix fuel supply stops and before the second premix fuel supply starts.

4. The method according to claim 3, wherein only the first and second pilot fuels support combustion device operation during the intermediate phase.

5. The method according to claim 2, comprising:
   injecting the first and the second pilot fuels together with the first premix fuel and after the first premix fuel supply is stopped, continuing to inject the first and second pilot fuels after the starting of the supply of the second premix fuel supply.

6. The method according to claim 3, comprising:
   starting the first pilot fuel supply before the second pilot fuel supply starts and starting the second pilot fuel supply such that both the first and second pilot fuels are supplied together to the combustion device.

7. The method according to claim 5, comprising:
   starting the first pilot fuel supply before the second pilot fuel supply starts.

8. The method according to claim 3, comprising:
   terminating the first pilot fuel supply before the second pilot fuel supply terminates.

9. The method according to claim 5, comprising:
   terminating the first pilot fuel supply before the second pilot fuel supply terminates.

10. The method according to claim 2, wherein the first premix fuel is a gaseous fuel of the first premix fuel supply and the second premix fuel is a liquid fuel of the second premix fuel supply.

11. The method according to claim 10, wherein when the first premix fuel is a gaseous fuel the first pilot fuel is also a gaseous fuel.

12. The method according to claim 10, wherein when the second premix fuel is a liquid fuel the second pilot fuel is also a liquid fuel.

13. The method according to claim 10, wherein the first premix fuel and the first pilot fuel are the same fuel and the second premix fuel and the second pilot fuel are the same fuel.

14. The method according to claim 2, wherein the first premix fuel is a liquid fuel and the second premix fuel is a gaseous fuel.

15. The method according to claim 14, wherein when the first premix fuel is a liquid fuel the first pilot fuel is also a liquid fuel.

16. The method according to claim 2, wherein when the second premix fuel is a liquid fuel the second pilot fuel is a liquid fuel.

17. The method according to claim 1, wherein the operation of the combustion device via the at least one pilot fuel only generates diffusion flames after the supplying of the first premix fuel is stopped and before the second premix fuel is supplied to the combustion device.

18. A method for switching over a combustion device from operation with a first premix fuel to a second premix fuel during continuous operation of the combustion device comprising:

reducing a first premix fuel supply to the combustion device and subsequently stopping supply of the first premix fuel to the combustion device;
operating the combustion device with at least one pilot fuel so that the at least one pilot fuel is injected to only generate at least one diffusion flame in the combustion device in an intermediate phase after the first premix fuel is no longer supplied to the combustion device and prior to starting a supply of a second premix fuel to the combustion device to stabilize combustion in the combustion device; and
starting the supply of the second premix fuel to the combustion device after only the at least one diffusion flame is generated; and
wherein the first premix fuel is comprised of at least one gas and a first type of fuel and the second premix fuel is comprised of at least one gas and a second type of fuel that differs in composition from the first type of fuel.

19. A method for switching over a combustion device from operation with a first premix fuel to a second premix fuel comprising:
reducing a first premix fuel supply to the combustion device and subsequently stopping supply of the first premix fuel to the combustion device;
operating the combustion device with at least one pilot fuel so that the at least one pilot fuel is injected to only generate at least one diffusion flame in the combustion device in an intermediate phase after the first premix fuel is no longer supplied to the combustion device and prior to starting a supply of the second premix fuel to the combustion device to stabilize combustion in the combustion device, wherein the operating of the combustion device with the at least one pilot fuel so that the at least one pilot fuel is injected to only generate at least one diffusion flame in the combustion device in the intermediate phase after the first premix fuel is no longer supplied to the combustion device and prior to starting the supply of the second premix fuel to the combustion device to stabilize combustion in the combustion device comprises:
feeding a first pilot fuel of the at least one pilot fuel to form a pilot flame for generation of the at least one diffusion flame; and
feeding a second pilot fuel of the at least one pilot fuel to form the pilot flame after feeding the first pilot fuel is started; and
starting the supply of the second premix fuel to the combustion device after only the at least one diffusion flame is generated; and
wherein the first premix fuel is comprised of at least one gas and a first type of fuel and the second premix fuel is comprised of at least one gas and a second type of fuel that differs from the first type of fuel, wherein the first type of fuel is a gaseous fuel and the second type of fuel is a liquid fuel or the first type of fuel is the liquid fuel and the second type of fuel is the gaseous fuel.

20. The method of claim 19, comprising:
stopping the feeding of the first pilot fuel to the combustion device after the starting of the supplying of the second premix fuel to the combustion device; and
stopping the feeding of the second pilot fuel to the combustion device after the feeding of the first pilot fuel is stopped and while the second premix fuel is being supplied to the combustion device; and
wherein the at least one diffusion flame is generated to dampen pulsations in the combustion device.

* * * * *